US011215504B2

(12) United States Patent
Mai (10) Patent No.: US 11,215,504 B2
(45) Date of Patent: Jan. 4, 2022

(54) HIGH-THROUGHPUT COMPACT STATIC-FOURIER-TRANSFORM SPECTROMETER

(71) Applicant: Hong Kong Applied Science and Technology Research Institute Co., Ltd., Shatin (HK)

(72) Inventor: Jiangquan Mai, Shatin (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 17/089,518

(22) Filed: Nov. 4, 2020

(65) Prior Publication Data

US 2021/0310864 A1    Oct. 7, 2021

Related U.S. Application Data

(60) Provisional application No. 63/003,323, filed on Apr. 1, 2020.

(51) Int. Cl.
*G01J 3/02* (2006.01)
*G02B 19/00* (2006.01)
(Continued)

(52) U.S. Cl.
CPC ........... *G01J 3/0216* (2013.01); *G01J 3/0208* (2013.01); *G01J 3/0218* (2013.01); *G01J 3/0224* (2013.01);
(Continued)

(58) Field of Classification Search
None
See application file for complete search history.

(56) References Cited

U.S. PATENT DOCUMENTS 6,222,627 B1    4/2001  Seitz et al.
7,420,663 B2    9/2008  Wang et al.
(Continued)

FOREIGN PATENT DOCUMENTS

CN    101046409 A    10/2007
CN    102297722 B    8/2014
(Continued)

OTHER PUBLICATIONS

"Cell-Phone-Based Platform for Biomedical Device Development and Education Applications" Zachary J. Smith et al., Mar. 2, 2011, https://doi.org/10.1371/journal.pone.0017150.
(Continued)

*Primary Examiner* — Shawn Decenzo
(74) *Attorney, Agent, or Firm* — Norton Rose Fulbright US LLP (57) ABSTRACT

Systems and methods which provide a high-throughput point source light coupling structure implementing a condenser configured according to one or more condenser configuration rules are described. Embodiments of a high-throughput point source light coupling structure utilize a birefringent plate configuration in combination with a condenser and point source to provide a light coupler structure for a birefringent-static-Fourier transform interferometer implementation. According to some examples, the optical axis of a first and second birefringent plate of a birefringent plate configuration are not in the same plane. A condenser of a high-throughput point source light coupling structure of embodiments is provided in a defined (e.g., spaced, relational, etc.) relationship with respect to the point source and/or a camera lens used in capturing an interference pattern generated by the light coupling structure. High-throughput point source light coupling structures herein may
(Continued)

be provided as external accessories for processor-based mobile devices having image capturing capabilities.

20 Claims, 6 Drawing Sheets

(51) Int. Cl.
*G02B 5/30* (2006.01)
*G01J 3/453* (2006.01)

(52) U.S. Cl.
CPC ........... *G01J 3/0256* (2013.01); *G01J 3/4531* (2013.01); *G02B 5/3083* (2013.01); *G02B 19/0014* (2013.01); *G02B 19/0085* (2013.01); *G01J 2003/4538* (2013.01)

(56) References Cited

U.S. PATENT DOCUMENTS

| | | | |
|---|---|---|---|
| 8,654,347 | B2 | 2/2014 | Antila et al. |
| 8,861,086 | B2 | 10/2014 | Liu et al. |
| 9,185,200 | B2 | 11/2015 | Cunningham |
| 9,316,539 | B1 | 4/2016 | Phua |
| 10,393,579 | B2 | 8/2019 | Herrmann et al. |
| 2015/0022705 | A1* | 1/2015 | Wang .................. H04N 5/2254 348/333.1 |
| 2015/0104860 | A1 | 4/2015 | Cunningham |
| 2017/0131146 | A1 | 5/2017 | Oto |
| 2018/0321083 | A1* | 11/2018 | Herrmann ............. G01J 3/0208 |
| 2020/0025611 | A1 | 1/2020 | Mai et al. |
| 2021/0124159 | A1* | 4/2021 | Stein ........................ G02B 1/04 |

FOREIGN PATENT DOCUMENTS

| | | |
|---|---|---|
| CN | 108593105 A | 9/2018 |
| CN | 110274692 A | 9/2019 |
| WO | WO-2011093794 A1 | 8/2011 |

OTHER PUBLICATIONS

"High-performance nonscanning Fourier-transform spectrometer that uses a Wollaston prism array", Applied Optics vol. 43, Issue 20, pp. 3983-3988 (2004).

"Multichannel Fourier-transform infrared spectrometer", Applied Optics vol. 31, Issue 28, pp. 6096-6101 (1992).

Patent Cooperation Treaty, International Search Report issued for PCT Application No. PCT/CN2020/127732, dated Feb. 9, 2021, 5 pages.

* cited by examiner

HIGH-THROUGHPUT COMPACT STATIC-FOURIER-TRANSFORM SPECTROMETER

CROSS-REFERENCE TO RELATED APPLICATIONS

The present application claims benefit of priority to U.S. Provisional Patent Application No. 63/003,323, entitled "A HIGH-THROUGHPUT COMPACT STATIC-FOURIER-TRANSFORM SPECTROMETER," filed on Apr. 1, 2020, the disclosure of which is incorporated herein by reference in its entirety.

TECHNICAL FIELD

The invention relates generally to optical spectrometers and, more particularly, to high-throughput compact static-Fourier-transform spectrometer configurations, such as may be suitable for use with respect to mobile and portable electronic devices.

BACKGROUND OF THE INVENTION

A spectrometer is an instrument used to measure properties of light over a specific portion of the electromagnetic spectrum. For example, a spectrometer can separate white light and measure individual narrow bands of color (i.e., spectrum). The variables measured by a spectrometer may, for example, comprise spectral intensity and/or irradiance of the light. Such light measurements made by a spectrometer are typically used to identify materials.

Spectrometers have traditionally been difficult to use with field work outside of a lab due to their bulky size and high cost. As such, although spectrometers are highly useful analytical instruments, they have seen limited adoption by the general public and are commonly restricted to use with respect to lab work.

In recent years, however, spectrometer configurations have begun to progress towards miniaturization. Spectrometers have evolved from large benchtop devices (e.g., a unit size of 550 mm×420 mm×270 mm having an operational wavelength range of 325-1000 nm, and providing a resolution of 4 nm) available in 2010, to relatively large, self-contained devices (e.g., a unit size of 175 mm×110 mm×44 mm, having an operational wavelength range of 200-1100 nm, and providing resolution of 0.05-20 nm) and compact self-contained devices (e.g., a unit size of 40 mm×42 mm×24 mm, having an operational wavelength range of 350-800 nm, and providing resolution of 1-10 nm) available in 2012, to more compact, mini-spectrometer configurations (e.g., a unit size of 12 mm×20 mm×10 mm, having an operational wavelength range of 340-780 nm, and providing resolution of 15 nm) available in 2013. More recently spectrometers have been implemented as smartphone external accessories (e.g., an attachable accessory size of 55 mm×20 mm×20 mm, having an operational wavelength range of 380-750 nm, and providing resolution of 10 nm) available in 2016. The spectrometers of all such form factors have generally suffered from one or more disadvantages, such as relatively large dimensions, low stability, low resolution, narrow or limited spectral range, low throughput and sensitivity, etc.

Configurations used in implementing smartphone spectrometer external accessories, for example, have generally been very large when compared to the size of the host smartphone and have required delicate and complicated collimators, grating, and/or filter apparatuses. Existing smartphone-based spectrometers, in addition to being bulky in dimension, generally provide low resolution and narrow measurement wavelength range. As examples, the smartphone-based spectrometers of U.S. Pat. Nos. 7,420,663, 8,861,086, and 9,185,200 and the smartphone-based spectrometer described in PLOS One Journal e17150, Mar. 2, 2011 all implement complicated grating structures. The smartphone-based spectrometer of the above mentioned U.S. Pat. No. 9,185,200 and the smartphone-based spectrometer described in the above mentioned PLOS One Journal, in addition to implementing grating, also implement complicated collimation systems. In an alternative configuration to grating implementations, the smartphone-based spectrometer of U.S. Pat. No. 8,654,347 implements a complicated Fabry-Perot filter configuration. Existing spectrometers usable on a smartphone platform using such grating or filter configurations suffer from large size, low resolution, low throughput/sensitivity, and/or narrow or limited spectral range.

A configuration based on conventional Michelson interferometer in the smartphone-based spectrometer of U.S. Pat. No. 8,086,266 comprises moving and separated mechanical parts and complicated microelectromechanical systems which requires extra power supplied from the smartphone. Configurations requiring moving and/or separated mechanical parts in their designs can greatly affect the accuracy of spectrum measurement (e.g., during operation, external vibrations influence the steadiness of the reflectors movement that limits ability of using those spectrometers under conditions of strong vibrations). Such spectrometer configurations suffer from low vibration stability and large size.

The spectrometer configurations of U.S. patent publication number 20170131146, U.S. Pat. Nos. 6,222,627 and 9,316,539, and Chinese patent number 102297722 use birefringent crystal configurations that are not well suited for use with the large field of view (e.g., 600 to 120°) of many current smartphones and/or are provide distorted/non-symmetric interference patterns which are incompatible with the use of Fourier transform processing to obtain the spectrum. For example, the birefringent crystal configuration of U.S. patent publication number 20170131146 uses a Savart plate interferometer implementation (i.e., two birefringent plates, each having optical axis at 45° to the respective plate) in providing collimated light to a micro-lens array, resulting in a relatively large and complicated collimator implementation that requires a small angle incidence and provides a small field of view (e.g., 5°). The birefringent crystal configuration of U.S. Pat. No. 6,222,627 uses a Wollaston prism interferometer implementation (i.e., two right triangle birefringent prisms with perpendicular optic axes) in providing collimated light to an imaging lens and detector, resulting in a relatively large collimator implementation that requires normal incidence light source and provides a small field of view (e.g., 1° to 3°). The birefringent crystal configuration of Chinese patent number 102297722 uses a combination of a Wollaston prism and Savart plate interferometer implementation and suffers from disadvantages of both. U.S. Pat. No. 9,316,539 uses a birefringent plate implementation in which a focusing lens provides frontend optics relying upon a diffused light source for optimal operation and providing either a relatively small field of view or a larger field of view with very low sensitivity (e.g., most of the light is diffused/scattered and unable to be collected by the small-aperture camera.

U.S. patent publication number 20200025611 provides a beam-splitter cube spectrometer configuration. The beam-splitter interferometer implementation of U.S. patent publication number 20200025611 facilitates relatively simple data analysis processing by a host smartphone using generally low cost materials, although potentially experiencing somewhat low throughput.

As may be appreciated from the foregoing, the configurations heretofore used in implementing smartphone spectrometer external accessories have suffered from various disadvantages. In particular, many configurations are unable to take full advantage of the relevant aspects of powerful smartphone cameras. Moreover, many configurations are unable to meet the demand of various applications, such as due to limitations with respect to sensitivity, spectral resolution, spectral range, size, etc.

BRIEF SUMMARY OF THE INVENTION

The present invention is directed to systems and methods which provide a high-throughput point source light coupling structure implementing a condenser configured according to one or more condenser configuration rules, such as for mobile device based spectrometer configurations. Embodiments of a high-throughput point source light coupling structure utilize a birefringent plate configuration in combination with a condenser and point source to provide a light coupler structure for a birefringent-static-Fourier transform interferometer implementation, such as to provide high light collection efficiency, wide incidence angle, broad spectral range, etc. with respect to a relatively small sized, high resolution spectrometer.

A birefringent plate configuration of a high-throughput point source light coupling structure of embodiments may comprise one or more birefringent plates formed from birefringent material. Embodiments of the invention may utilized a birefringent plate configuration including at least two birefringent plates. According to some examples, the principal section of a first birefringent plate is perpendicular to the principal section of a second birefringent plate of a birefringent plate configuration. Further, in accordance with some examples, the optical axis of the second birefringent plate of a birefringent plate configuration is parallel or vertical to the plane of the second birefringent plate. The optical axis of the first birefringent plate of a birefringent plate configuration may, for example, be in the range of −90° to +90° with respect to the plane of the first birefringent plate according to some embodiments. The optical axis of the first birefringent plate of a birefringent plate configuration of some examples may be rotated −45° or +45° to the plane of the first birefringent plate. The optical axis of the first birefringent plate of a birefringent plate configuration of some examples may be parallel or vertical to the plane of the first birefringent plate, while being perpendicular to the optical axis of the second birefringent plate.

A condenser of a high-throughput point source light coupling structure of embodiments is provided in a defined (e.g., spaced, relational, etc.) relationship with respect to the point source and a camera lens used in capturing an interference pattern generated by the light coupling structure. For example, one or more condenser configuration rules may be implemented with respect to the condenser configuration of a high-throughput point source light coupling structure implementation. Condenser configuration rules defining a condenser configuration of a high-throughput point source light coupling structure of embodiments may, for example, provide defined relationships with respect to focal lengths of the condenser and the camera lens, numerical aperture of the condenser and the camera lens, distance between the condenser and the camera lens, distance between the condenser and point source, etc.

Light coupling structures utilizing a birefringent plate configuration in combination with a condenser and point source according to embodiments provides high light collection efficiency for high throughput, facilitating enhanced sensitivity of a spectrometer implementation and broad spectral range. A birefringent plate configuration of a high-throughput point source light coupling structure of embodiments generates wide incident angle for the birefringent interferometer facilitating improved resolution. High-throughput point source light coupling structures of embodiments are compatible to point source input and small aperture imaging systems. In particular, high-throughput point source light coupling structures of embodiments are well suited for use with respect to wide field of view (FOV) and small aperture cameras, such as those of mobile device camera configurations. Moreover, the short focal length of a mobile device camera lens and a condenser of embodiments of a high-throughput point source light coupling structure facilitates compact size spectrometer implementation. Accordingly, high-throughput point source light coupling structures may be provided which are small enough to be used with existing imaging devices (e.g., digital cameras), such as those incorporated into portable equipment, and which is lightweight and convenient enough for a user to carry. Such portable spectrometer implementations may facilitate broadened application and markets for spectroscopy from industries and labs to ordinary consumers, facilitating use in food safety, jewelry inspection, scientific research, medicine, healthcare, art and design, etc.

High-throughput point source light coupling structures implemented according to concepts of the present invention may be provided as external accessories for processor-based mobile devices (e.g., smartphones, tablets, personal digital assistants (PDAs), notebook computers, etc.) having image capturing capabilities. For example, an external spectrometer accessory comprising embodiments of a high-throughput point source light coupling structure may be used to provide a birefringent-static-Fourier transform interferometer based spectrometer, when combined with the imaging system of a host mobile device and interferogram transform processing logic executed by a processor of the mobile device. Such birefringent-static-Fourier transform interferometer based spectrometers according to embodiments realize high throughput/sensitivity (e.g., sensitivity to weak incident light improved by 20 times as compared to prior smartphone based solutions), high resolution (e.g., improved by 5-10 times as compared to prior smartphone based solutions), wide spectral range (e.g., broadened from 380 nm-750 nm to 400 nm-1100 nm range as compared to prior smartphone based solutions), and ultra-compact (e.g., size reduced to ⅕ as compared to prior smartphone based solutions).

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which.

DETAILED DESCRIPTION OF THE INVENTION

Figure 1:
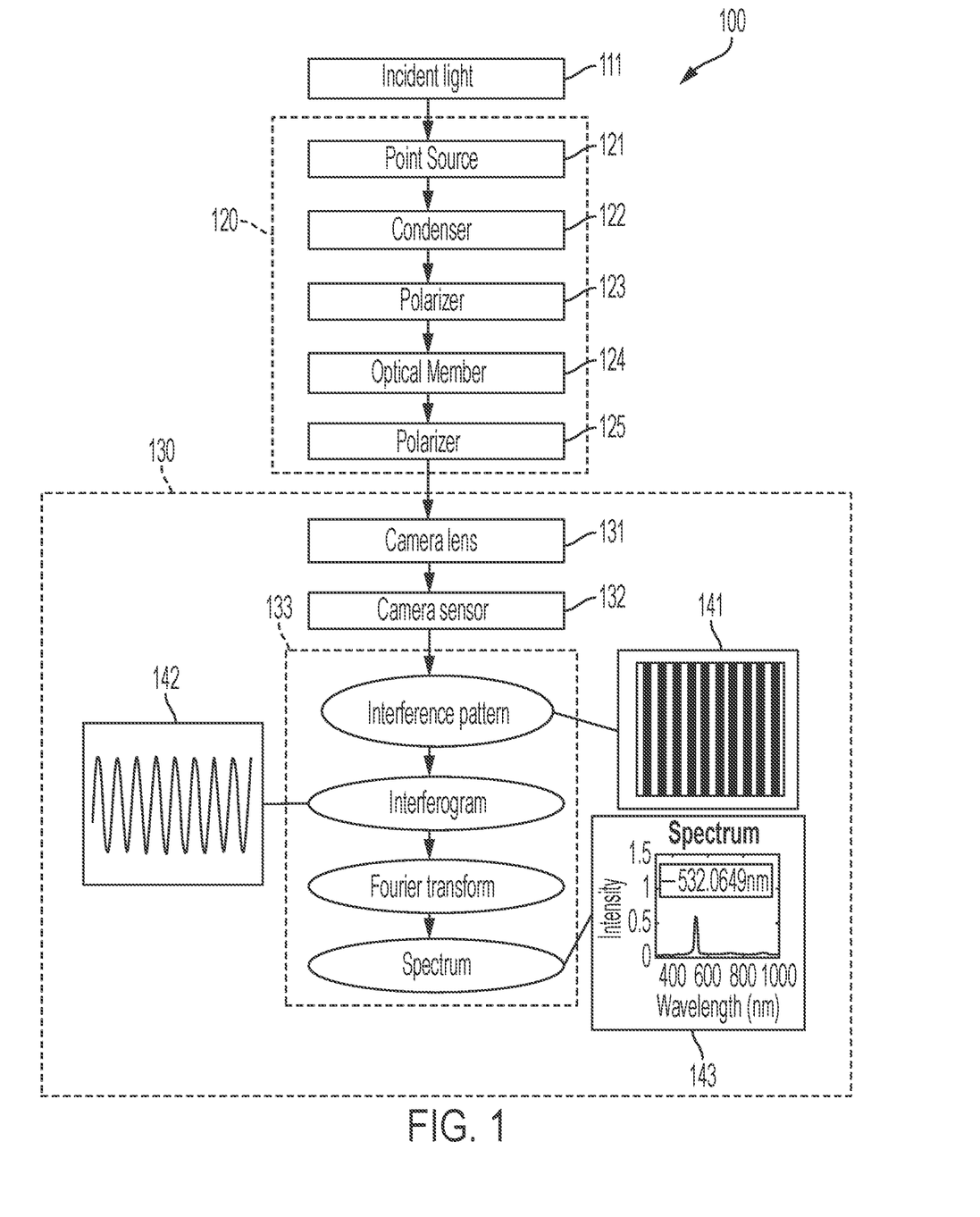
FIG. 1 shows a functional block diagram of a spectrometer implementing a high-throughput point source light coupling structure according to embodiments of the present invention.

FIG. 1 shows a functional block diagram of a spectrometer implemented using an embodiment of a high-throughput point source light coupling structure according to concepts of the present invention. Spectrometer 100 is shown as including high-throughput point source light coupling structure 120 and mobile device 130 configured to operate in cooperation to measure properties of light (e.g., provided as incident light 111) over a portion of the electromagnetic spectrum. High-throughput point source light coupling structure 120 may, for example, comprise a removable unit configured to attach (e.g., using one or more clips, adhesive, an over-case for the mobile device, one or more fasteners, etc.) to the mobile device in juxtaposition with a lens of an image capturing system of the mobile device. As will be better understood from the disclosure which follows, embodiments of high-throughput point source light coupling structure 120 and mobile device 130 may provide a very compact spectrometer configuration having a wide spectral range, high resolution, high throughput, and relatively low cost.

Mobile device 130 may, for example, comprise a smartphone (e.g., Apple IPHONE, Samsung GALAXY, Huawei P SMART, etc.), tablets (e.g., Apple IPAD, Samsung GALAXY TAB, Microsoft SURFACE, etc.), personal digital assistants (PDAs) (e.g., Hewlett-Packard IPAQ, Palm TUNGSTEN, etc.), notebook computers (e.g., portable personal computers based upon the Intel CORE, Advanced Micro Devices RYZEN, etc. families of processors), etc. having image capturing capabilities. Light coupling structure of high-throughput point source light coupling structure 120 incorporating a condenser according to embodiments may be configured to be compatible to point source input and the small aperture imaging systems of many mobile devices (e.g., smartphone and tablet camera configurations). Moreover, a short focal length (e.g., a focal length in the range of 2 mm-6 mm) of the condenser may cooperate with a short focal length camera lens (e.g., the camera lens of many smartphone and tablet camera configurations) facilitates a compact size of spectrometer 100 of embodiments.

In operation of embodiments of spectrometer 100, high-throughput point source light coupling structure 120 converts and directs incident light 111 to image capturing apparatus of mobile device 130. For example, incident light 111 passing through point source 121 may be manipulated by condenser 122, polarizer 123, optical member 124, and polarizer 125 to form an interference pattern for spectral processing by mobile device 130. Mobile device 130 of embodiments may comprise various forms of processor-based systems having image capturing capabilities. The image capturing capabilities may, for example, be provided by one or more image capturing apparatuses, such as a digital camera system integrated therein or coupled thereto. As shown in the illustrated example, an image capturing apparatus of mobile device 130 may include camera lens 131 and camera sensor used to capture an interference pattern (e.g., interference pattern 141) as provided by the light output from high-throughput point source light coupling structure 120. Mobile device 130 may utilize interferogram transform processing logic 133 to transform an interference pattern provided by high-throughput point source light coupling structure 120 into corresponding spectrum data (e.g., spectrum data 143).

In operation according to embodiments, spectrometer 100 may be utilized to generate data representative of the spectrum of observed incident light emitted by and/or reflected from a sample (not shown) for which spectroscopy is to be performed, such as for analyzing light containing features of absorption or emission associated with a sample material, substance, mixture, etc. Accordingly, incident light 111 may comprise light incident on high-throughput point source light coupling structure 120 that is emitted by and/or reflected from such a sample.

A light gateway is provided to introduce at least a portion of incident light 111 into high-throughput point source light coupling structure 120. Point source 121 may, for example, comprise a pinhole, slit, an optical fiber connector, and/or other pinpoint light gateway structure configured for passing a portion of incident light 111 into high-throughput point source light coupling structure 120 as a point source of light. Point source 121 converts incident light 111 to a point source of light according to embodiments of the invention.

Condenser 122 of embodiments provides an optical element (e.g., a lens, a lens group, a prism, a concave mirror, etc. comprised of optical glass, optical plastic, crystal, etc.) configured to render a divergent beam from a point source into a converging beam. In accordance with embodiments of the invention, high-throughput point source light coupling structure 120 is configured so that condenser 122 focuses and images point source 121 on camera lens 131. For example, high-throughput point source light coupling structure 120 utilizes a configuration of condenser 122 for facilitating efficient throughput. In accordance with embodiments, condenser 122 comprises a high-numerical aperture (NA) condenser (e.g., having a NA in the range of 0.4-0.8, where NA=n*sin(arctan(a/2f)), a is the aperture diameter of the lens, and n is the refractive index of the lens), as may facilitate wide angular acceptance for incoming light and high light collection efficiency for high throughput and improved resolution.

According to embodiments of the invention, condenser 122 may be provided in a defined relationship with respect to point source 121 and/or camera lens 131. For example, a spaced, relational, etc. relationship may be defined as between condenser 122 and point source 121 and/or as between condenser 122 and camera lens 131.

One or more condenser configuration rules may be implemented with respect to the configuration of condenser 122 of high-throughput point source light coupling structure 120 of embodiments. Condenser configuration rules defining a configuration of condenser 122 may provide defined relationships with respect to focal lengths, numerical aperture, distance, etc. For example, condenser configuration rules defining a configuration of condenser 122 provide defined relationships with respect to distance between the condenser and the camera lens and distance between the condenser and the point source, defined relationships with respect to the numerical aperture of the condenser and the camera lens, and defined relationships with respect to the focal lengths of the condenser and the camera lens.

Figure 2:
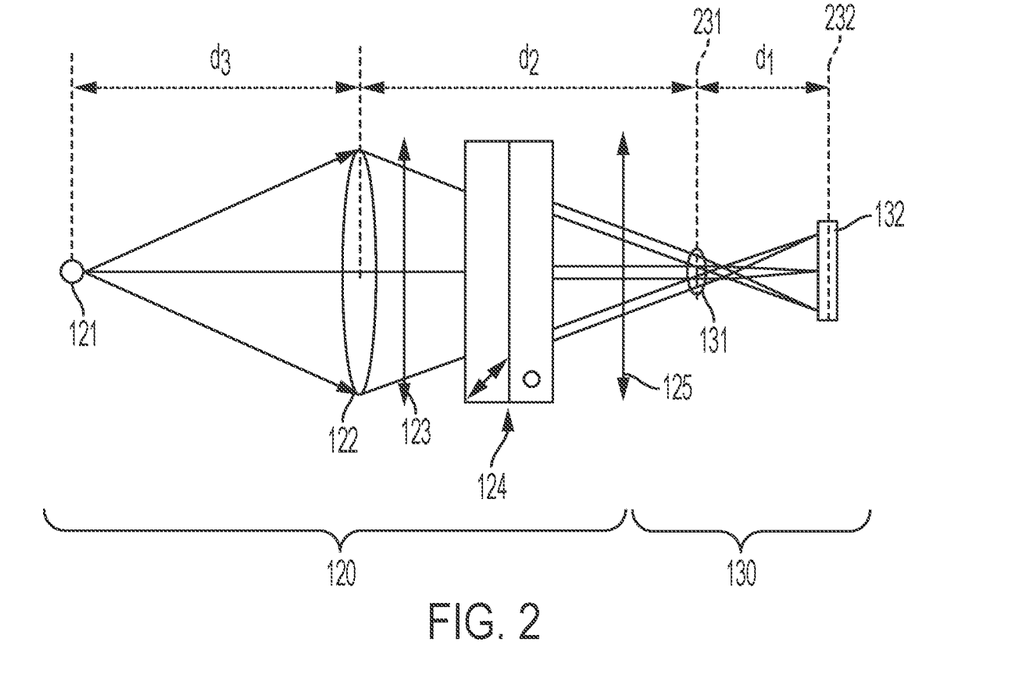
FIG. 2 shows detail with respect to a condenser configuration of a high-throughput point source light coupling structure of embodiments of the present invention.

FIG. 2 illustrates implementation of a configuration of condenser 122 according to condenser configuration rules of embodiments of the invention. The configuration of condenser 122 of high-throughput point source light coupling structure 120 shown in FIG. 2 may, for example, be subject to one or more defined relationship condenser configuration rules, such as may include defined numerical aperture relationship condenser configuration rules, defined focal length relationship condenser configuration rules, defined distance relationship condenser configuration rules, etc.

A defined numerical aperture relationship condenser configuration rule may establish a relationship between the numerical aperture of condenser 122 and the numerical aperture of camera lens 131. For example, a defined numerical aperture relationship condenser configuration rule may establish that a numerical aperture ($NA_2$) of condenser 122 is greater than a numerical aperture diameter ($NA_1$) of camera lens 131 (e.g., $NA_2 > NA_1$), such as to provide a light coupling structure well suited for point source input and small aperture imaging apparatus (e.g., imaging apparatus of a smartphone camera) and/or to generate wide incident angle for improved resolution of the spectrometer.

A defined focal length relationship condenser configuration rule may establish a relationship between the focal length of condenser 122 and the focal length of camera lens 131. For example, a defined focal length relationship condenser configuration rule may establish that a focal length ($f_2$) of condenser 122 is less than a focal length ($f_1$) of camera lens 131 (e.g., $f_2 < f_1$), such as to facilitate compact size embodiments of high-throughput point source light coupling structure 120. In accordance with some embodiments, the short focal length of condenser 122 established by the condenser configuration cooperates with a short focal length implementation of camera lens 131 to facilitate a compact size of high-throughput point source light coupling structure 120.

According to embodiments of spectrometer 100, high-throughput point source light coupling structure 120 operates in cooperation with an image capture apparatus of mobile device 130 to provide an interferometer implementation for measuring properties of incident light 111. Accordingly, in the example shown in FIG. 2, camera lens 131 of mobile device 130 provides an image plane of the light source (shown as image plane 231), and correspondingly the sensor plane of camera sensor 132 provides an image plane of the interference pattern (shown as image plane 232). In the example of the condenser configuration shown in FIG. 2, the distance from the center of camera lens 131 to sensor plane of camera sensor 132 (e.g., the image plane for an interferometer interference pattern of spectrometer 100) is $d_1$, the distance from the center of condenser 122 to the center of camera lens 131 (e.g., the image plane for the light source of spectrometer 100) is $d_2$, and the distance from point source 121 to the center of condenser 122 is $d_3$. One or more defined distance relationship condenser configuration rules may be used to establish some or all of the foregoing distances according to embodiments of the invention.

In accordance with some examples, distance from the center of camera lens 131 to the sensor plane of camera sensor 132 ($d_1$) corresponds to the focal length ($f_1$) of the image capturing apparatus (e.g., $d_1 = f_1$). The focal length $f_1$ and/or distance $d_1$ may be known from a fixed or otherwise established value provided by a manufacturer or user of the image capturing apparatus.

A first defined distance relationship condenser configuration rule may establish a distance relationship between condenser 122 and camera lens 131. For example, distance ($d_2$) from the center of condenser 122 to the center of camera lens 131 may be selected at least in part to accommodate the thickness of the components of the interferometer (e.g., camera lens, window glass, polarizers, optical members, and/or condenser) and the gaps between those components (e.g., the distance $d_2$ may be selected so as to be larger than the stacked thickness of the foregoing components). In accordance with embodiments of the invention, where a defined focal length relationship condenser configuration rule establishes a relationship between the focal length of condenser 122 and the focal length of camera lens 131, the distance ($d_2$) from the center of condenser 122 to the center of camera lens 131 established by a first defined distance relationship condenser configuration rule is derived or based at least in part on the focal length ($f_1$) of camera lens 131 (e.g., $d_2 \propto f_1$). A first defined distance relationship condenser configuration rule of embodiments of the invention may establish that the distance $d_2$ is to be larger than the focal length ($f_2$) of condenser 122 (e.g., $d_2 > f_2$, such as $(1.5 * f_2) < d_2 < (3.0 * f_2)$, wherein $f_2 < f_1$). In some examples, a first defined distance relationship condenser configuration rule may, for example, provide that the distance $d_2$ is ~ $(2.0 * f_2)$.

A second defined distance relationship condenser configuration rule may establish a distance relationship between condenser 122 and point source 121. For example, a second defined distance relationship condenser configuration rule may establish that the distance ($d_3$) from the center of condenser 122 to point source 121 follows the condition below:

$$\left| d_2 - \frac{f_2 d_3}{d_3 - f_2} \right| \tan\frac{\theta}{2} \le a_1 - a_2 \frac{d_2 - f_2}{f_2}, \quad (1)$$

where $a_1$ is the aperture diameter of point source 121 and $a_2$ is the aperture diameter of camera lens 131. In accordance with embodiments of the invention, where distance $d_3$ follows the condition of equation (1) above, the distance ($d_3$) from the center of condenser 122 to point source 121 is based on the distance ($d_2$) between condenser 122 and the center of camera lens 131 (e.g., the image plane of point source 121), the focal length ($f_2$) of condenser 122, the aperture diameter ($a_1$) of point source 121, and the aperture diameter ($a_2$) of camera lens 131. The relationship set forth in equation (1) may be utilized according to embodiments of the invention to tune the distances $d_2$ and $d_3$ to obtain the most compact size and/or highest throughput configuration for high-throughput point source light coupling structure 120.

High-throughput point source light coupling structure 120 implementing condenser 122 according to condenser configuration rules of embodiments of the invention provides a light coupling structure providing high light collection efficiency for enhanced sensitivity and improved resolution. Moreover, configurations of condenser 122 disposed within high-throughput point source light coupling structure 120 according to defined distance relationship condenser configuration rules of embodiments facilitates compact size spectrometer implementation.

Embodiments of a high-throughput point source light coupling structure utilize an optical member configuration in combination with point source 121 and condenser 122 to provide optical path differences with respect to light passed by the light coupler structure for facilitating a static-Fourier transform interferometer implementation. Referring again to FIG. 1, high-throughput point source light coupling structure 120 is shown as including polarizer 123, optical member 124, and polarizer 125 of a static-Fourier transform interferometer implementation according to some embodiments of the invention. In accordance with some embodiments, an optical member comprising one or more birefringent plates may be used in combination with point source 121 and condenser 122 to provide a light coupler structure for a birefringent-static-Fourier transform interferometer implementation.

Figure 3:
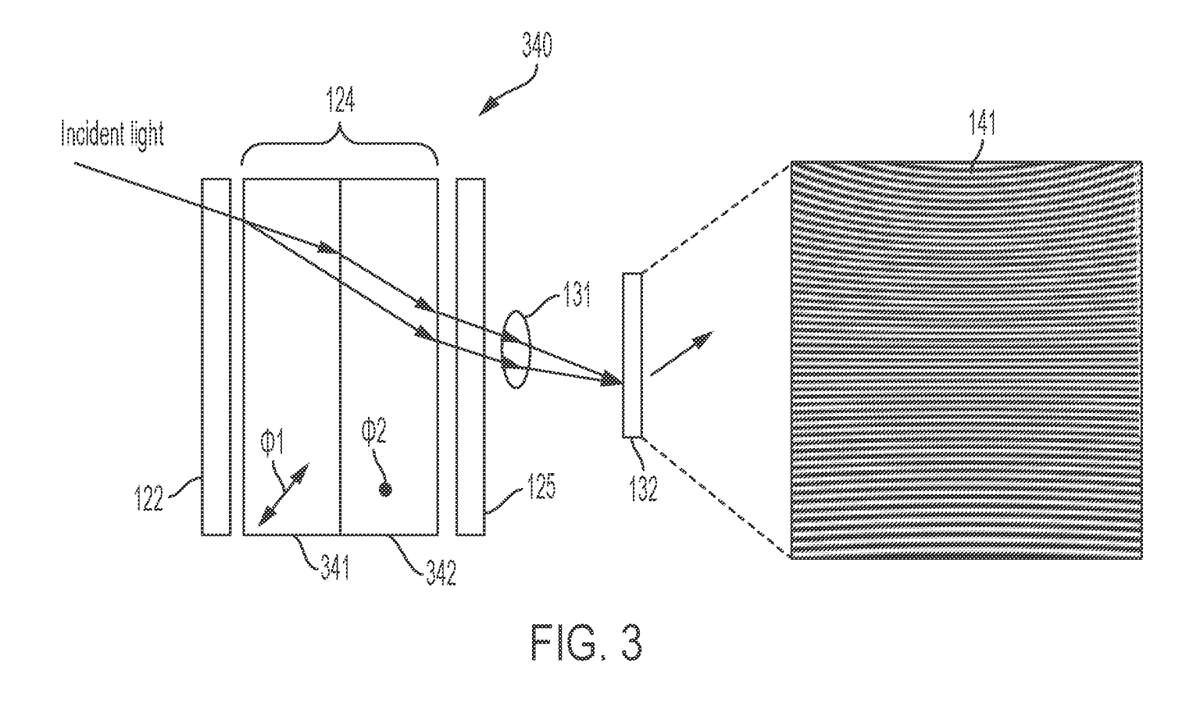
FIG. 3 shows detail with respect to a birefringent module configuration of a high-throughput point source light coupling structure of embodiments of the present invention.

A birefringent plate configuration as may be utilized in a birefringent interferometer implementation of some embodiments is shown in FIG. 3. A birefringent interferometer implemented using a birefringent plate configuration of high-throughput point source light coupling structure 120 of embodiments of the invention is configured to allow large incidence angles to facilitate a high resolution spectrometer implementation. For example, birefringent plate configurations according to concepts of the invention allowing large incidence angles facilitate large optical path difference variation for providing high resolution spectroscopy. In particular, birefringent plate configurations of some embodiments are designed to obtain large optical path differences within a short distance (e.g., within a distance corresponding to a short focal length of condenser 122) facilitating high resolution in a compact sized implementation (e.g., a compact mobile device spectrometer implementation). Additionally, birefringent plate configurations of embodiments facilitate generation of symmetric interference patterns (e.g., example interference pattern 141 represented in FIGS. 1 and 3), such as may enable fast Fourier transform (e.g., by interferogram transform processing logic of mobile device 130).

In providing a birefringent interferometer implementation of embodiments one or more birefringent plates (e.g., planar members having parallel primary surfaces) of a birefringent module may be disposed between condenser 122 and camera lens 131 to provide optical path differences with respect to rays (e.g., ordinary rays (o-rays) and extraordinary rays (e-rays) separated by a non-cubic crystal structure of the birefringent plate material) for generating an interference pattern (e.g., interference pattern 141). The optical path differences provided with respect to o-rays and e-rays of a birefringent module may, for example, vary with the incident angle. Birefringent plates 131 and 132 of embodiments of high-throughput point source light coupling structure 120 may, for example, be formed from various birefringent material, such as uniaxial or biaxial crystals having non-cubic crystal structures, plastics having molecules in a stretched conformation, etc.

As shown in FIG. 3, optical member 124 of embodiments may comprise a plurality of birefringent plates, such as birefringent plate 341 and birefringent plate 342. The birefringent plates may be disposed in proximity (e.g., adjacent or near) to each other having their principal sections perpendicular, or substantially perpendicular, to each other. For example, optical member 124 of the example illustrated in FIG. 3 include birefringent plate 341 disposed in proximity to birefringent plate 342 and configured so that the principal section of birefringent plate 341 is perpendicular, or essentially perpendicular, to the principal section of birefringent plate 342. In accordance with some embodiments a rear primary surface of birefringent plate 341 may be adjacent to, and contacting, a front primary surface of birefringent plate 342. In accordance with another embodiment, a gap (e.g., an air gap, a space filled with an optical glass, optical plastic, optical adhesive, etc.) on the order of 1 mm may be provided between a rear primary surface of birefringent plate 341 and a front primary surface of birefringent plate 342.

In the example of FIG. 3, birefringent plates of optical member 124 of embodiments are disposed between polarizers 123 and 125 to provide birefringent module 340 of high-throughput point source light coupling structure 120. For example, polarizer 123 may be provided adjacent to, and contacting, a front primary surface of a birefringent plate of optical member 124 or may be provided with a gap (e.g., an air gap, a space filled with an optical glass, optical plastic, optical adhesive, etc.) on the order of 1 mm between the front primary surface of the birefringent plate. Similarly, polarizer 125 may be provided adjacent to, and contacting, a rear primary surface of a birefringent plate of optical member 124 or may be provided with a gap (e.g., an air gap, a space filled with an optical glass, optical plastic, optical adhesive, etc.) on the order of 1 mm between the rear primary surface of the birefringent plate. Polarizers 123 and 125 may, for example, each comprise a polarizing sheet or film having their surfaces perpendicular, or substantially perpendicular, to an optical path (e.g., path between point source 121 and camera lens 131) of high-throughput point source light coupling structure 120. In accordance with some embodiments of the invention, polarizers 123 and 125 provide 45° polarization (e.g., 45° left or 45° right polarization).

Figure 4A:
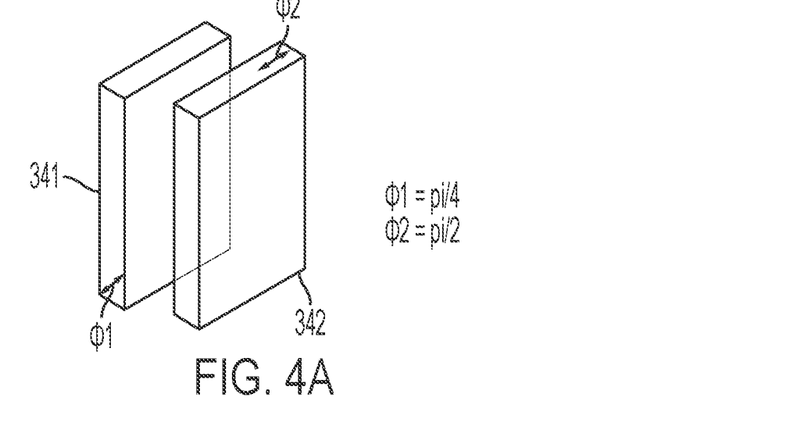
FIGS. 4A-4C shows birefringent plate configurations of a birefringent module according to embodiments of the present invention.
Figure 4B:
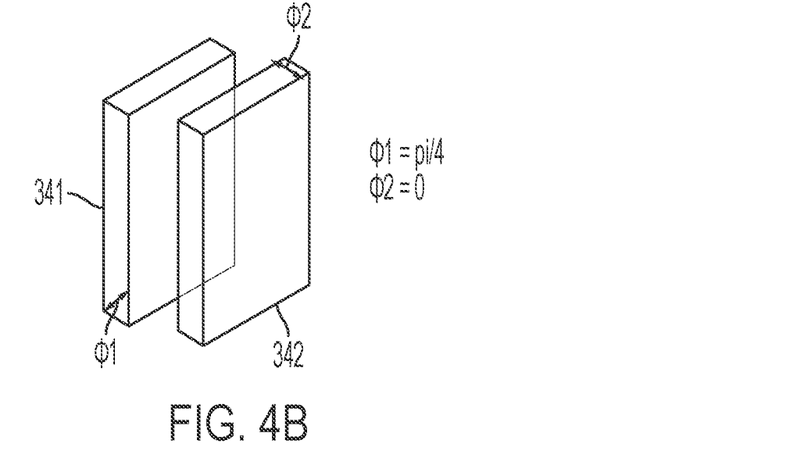
Figure 4C:
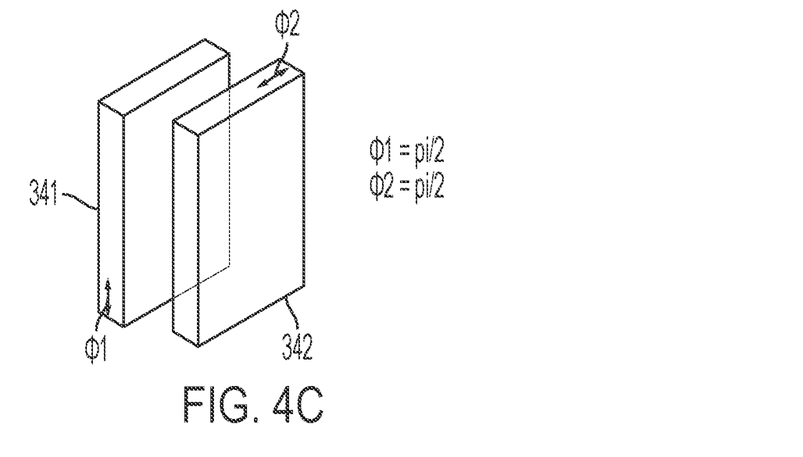

In accordance with some examples, the optical axes of the birefringent plates of optical member 124 are configured in a predetermined relationship with each other. Embodiments of the invention may, for example, implement configurations in which the optical axes of the birefringent plates 341 and 342 are not within the same plane. According to some embodiments, the optical axis of the second birefringent plate of the high-throughput point source light coupling structure is be parallel or vertical to the plane of the plate (e.g., $\Phi 2 = pi/2$ or $\Phi 2 = 0$). For example, the optical axis of birefringent plate 342 (e.g., a second birefringent plate in an optical path of the high-throughput point source light coupling structure) may be parallel or vertical to the plane of the birefringent plate while the optical axis of birefringent plate 341 is rotated 45° to the plane of the plane of the birefringent plate. The optical axis ($\Phi 1$) of birefringent plate 341 of the example of FIG. 4A is shown to be rotated 45° to the plane of birefringent plate 341 ($\Phi 1 = pi/4$) while optical axis ($\Phi 2$)

of birefringent plate 342 of this example is shown to be parallel to the plane of birefringent plate 342 ($\Phi 2$=pi/2), in accordance with some embodiments. In contrast, the optical axis ($\Phi 1$) of birefringent plate 341 of the example of FIG. 4B is shown to be rotated 45° to the plane of birefringent plate 341 ($\Phi 1$=pi/4) while the optical axis of birefringent plate 342 of this example is shown to be vertical to the plane of birefringent plate 342 ($\Phi 2$=0), in accordance with some embodiments. In the example of FIG. 4C, the optical axis ($\Phi 1$) of birefringent plate 341 of this example is shown to be parallel to the plane of birefringent plate 341 ($\Phi 1$=pi/2) while the optical axis of birefringent plate 342 of this example is shown to be parallel to the plane to birefringent plate 342 ($\Phi 2$=pi/2), in accordance with some embodiments.

Figure 5A:
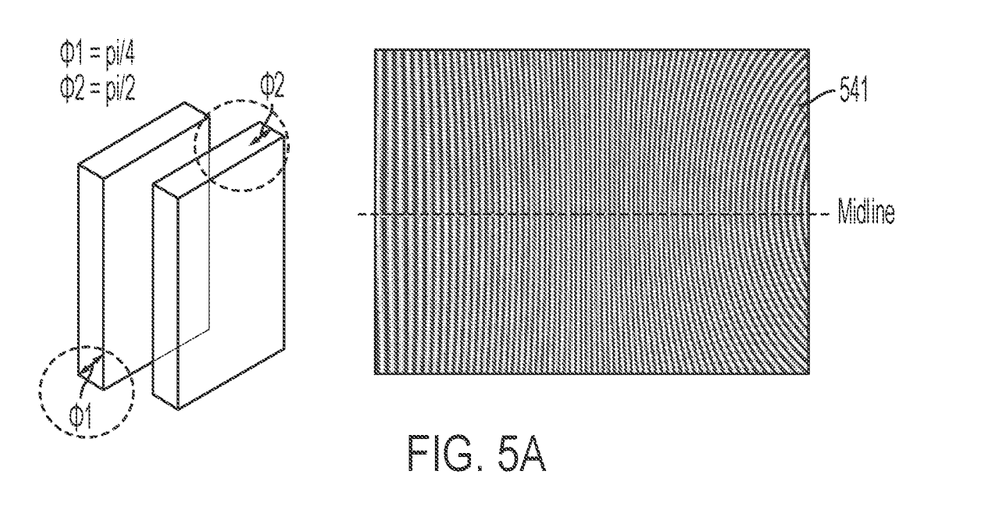
FIGS. 5A and 5B illustrate interference patterns as may result from various birefringent plat configurations.
Figure 5B:
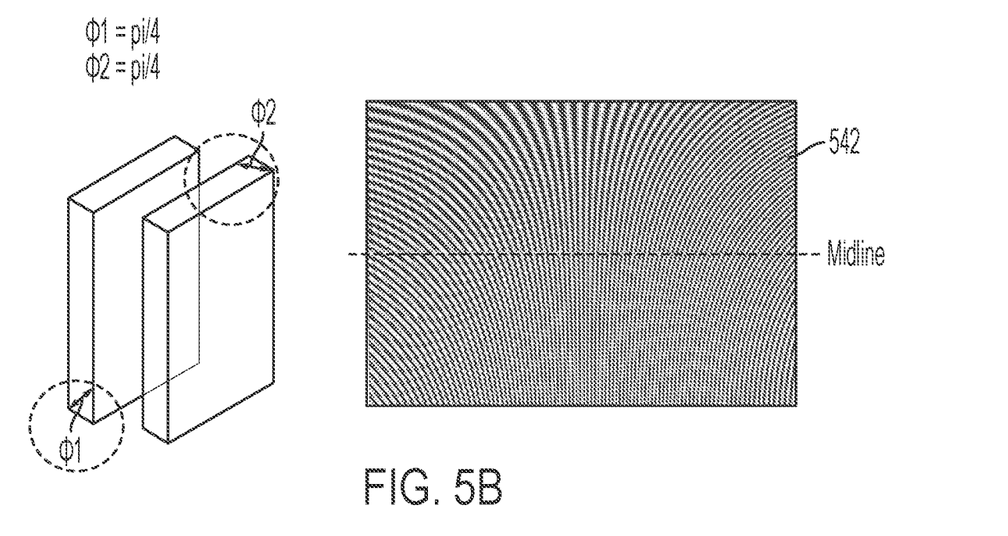

Configurations in which the optical axes of the birefringent plates 341 and 342 are not within the same plane according to embodiments of the invention may be utilized to provide implementations that are compatible with a large field of view (e.g., 60° to 120°) often provided by the imaging system of mobile devices and/or to accommodate a large incident angle from the condenser for large optical path difference variation facilitating high resolution spectroscopy by spectrometer 100. For example, using a configuration in which the optical axis ($\Phi 1$) of a first birefringent plate is rotated 45° to the plane plate 341 ($\Phi 1$=pi/4) and the optical axis ($\Phi 2$) of a second birefringent plate is parallel to the plane of the plate 342 ($\Phi 2$=pi/2) with respect to a 60° field of view results in an interference pattern that is symmetric about its midline, as shown in simulated interference pattern 541 of FIG. 5A. Such a symmetric interference pattern facilitates Fourier transform processing to obtain the spectrum using fast Fourier transform. In contrast, using a conventional Savart plate interferometer configuration (i.e., two birefringent plates, each having optical axis at 45° to the respective plate) with respect to a 60° field of view results in an interference pattern that is non-symmetric about it midline, as shown in simulated interference pattern 542 of FIG. 5B. Such a non-symmetric interference pattern is significantly distorted and can prevent the use of Fourier transform to obtain the spectrum.

Referring again to FIG. 1, in operation of spectrometer 100 of embodiments, incident light 111 (e.g., emitted by and/or reflected from a sample) impinging point source 121 of high-throughput point source light coupling structure is introduced into an optical path of the light coupling structure for manipulating to form an interference pattern for spectral processing by mobile device 130. Condenser 122 operates to focus and image the light provided by point source 121 on camera lens 131. Optical member 124 disposed in the optical path of high-throughput point source light coupling structure 120 between condenser 122 and camera lens 131 operates to provide different optical paths with respect to rays of light passed by the high-throughput point source light coupling structure (e.g., separate the light to o-ray and e-ray components and create optical path differences with respect to these rays). Camera lens 131 provides an image plane of point source 121, as focused by condenser 122, and focuses the light (e.g., the o-rays and e-rays) on an interference plane corresponding to the sensor plane of camera sensor 132. Accordingly, camera sensor 132 captures interference pattern 141 as a digital image and provides the digital image to interferogram transform processing logic 133 to obtain the spectrum.

Interferogram transform processing logic 133 of embodiments comprises logic configured to transform the interference pattern provided by high-throughput point source light coupling structure 120 into the corresponding spectrum data (e.g., spectrum data 143). Interferogram transform processing logic 133 may, for example, comprise code (e.g., software, firmware, application code, computer instruction set, applet, smart device app, etc.) stored in a computer readable memory (e.g., random access memory (RAM), read only memory (ROM), flash memory, magnetic memory, optical memory, etc.) and executed by one or more processors (e.g., central processing unit (CPU), graphics processing unit (GPU), microprocessor (MPU), etc.) of a host processor-based system (e.g., mobile device 130). Additionally or alternatively, interferogram transform processing logic 133 may comprise hardware logic circuits (e.g., logic circuits provided by an application specific integrated circuit (ASIC), a field programmable gate array (FPGA), etc.). Irrespective of the particular implementation, interferogram transform processing logic 133 of embodiments of the invention is configured to generate interferograms (e.g., interferogram 142) from a captured interference pattern (e.g., interference pattern 141) provided thereto, and to transform interferograms to corresponding spectrum data (e.g., spectrum data 143). For example, interferogram transform processing logic 133 may combine the signals for light having traveled different optical paths (e.g., the o-rays and e-rays) of interference pattern 141 focused on camera sensor 132 to generate interferogram 142. Thereafter, interferogram transform processing logic 133 may implement Fourier transform computations to transform raw interferogram data derived from the interference pattern into data representative of the actual spectrum of the observed incident light (e.g., spectrum data 143), such as for analyzing light containing features of absorption or emission associated with a sample substance or mixture.

Embodiments of high-throughput point source light coupling structure 120 implementing condenser 122 configured according to condenser configuration rules in combination with birefringent module 340 including birefringent plates 341 and 342 having their optical axes configured so as not to be within the same plane, as described above, provide high light collecting efficiency (e.g., up to 100%), high resolution (e.g., <2 nm@400 nm, <3 nm@600 nm, and <8 nm@900 nm), and broad spectral range (e.g., 400 nm to 1100 nm) in a compact form factor (e.g., a mobile device attachment having a thickness within 10 mm). As shown in the experimental results illustrated in the graphs of FIGS. 6A and 6B, embodiments of spectrometer 100 comprising high-throughput point source light coupling structure 120 configured in accordance with the concepts described above provides high throughput and wide incident angle facilitating enhanced sensitivity, broad spectral range, and high resolution.

Figure 6A:
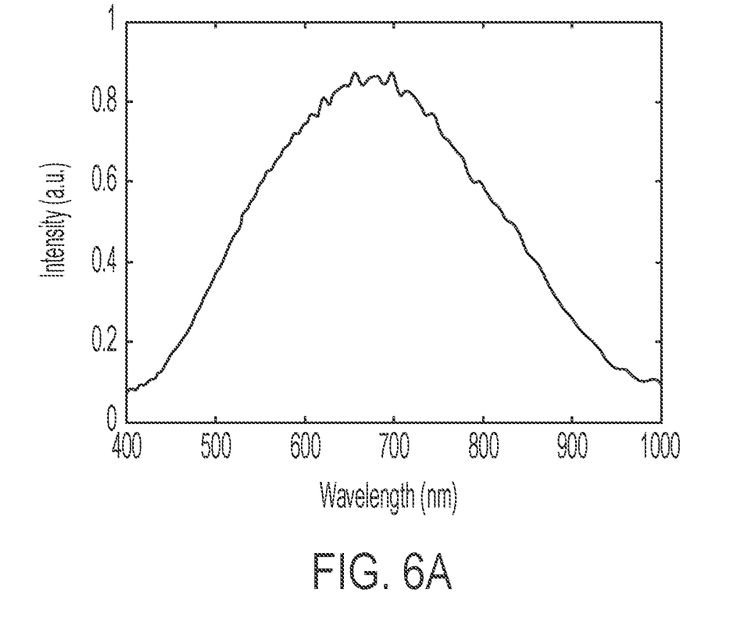
FIGS. 6A and 6B show experimental results for various light coupling structure implementations.
Figure 6B:
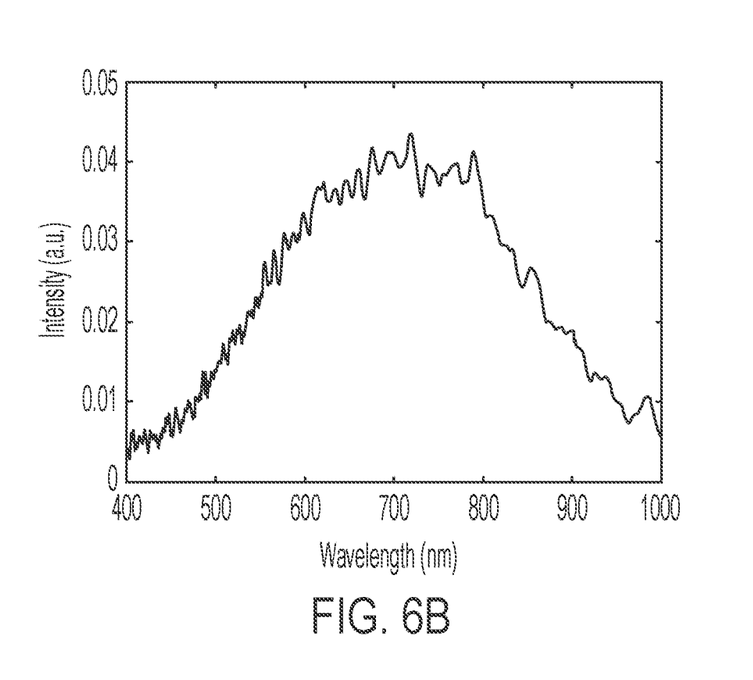

In the experiments represented by FIGS. 6A and 6B a Huawei P10 PLUS smartphone was used as the host mobile device of a spectrometer implementation. This host mobile device provided an imaging system comprising a CMOS camera sensor providing 3840×5120 pixels, a camera lens having a focal length of 3.95 mm and a camera aperture of 2.19 mm. An exposure time of 0.25 ms, ISO setting of 50, and a halogen lamp was used in conducting the experiments. The light coupling structures utilized in the experiments included a point source comprising an optical fiber connector having a fiber with a 400 nm core and 0.39 NA. FIG. 6A shows a graph of the wavelength and intensity of light detected by the mobile device camera sensor when using a high-throughput point source light coupling structure including a condenser and birefringent plates configured in accordance with examples described above. In contrast, FIG. 6B shows a graph of the wavelength and intensity of light detected by the mobile device camera sensor when using a light coupling structure including birefringent plates configured in accordance with examples described above, but without a condenser. As can be seen in a comparison of the graphs of FIGS. 6A and 6B, the maximum intensity increases from 0.04 to 0.8 when the high-throughput point source light coupling structure including a condenser and birefringent plates is used. It can be appreciated that high-throughput point source light coupling structures including a condenser and birefringent plates configured in accordance with concepts of the present invention enhance throughput (e.g., by 20 times in this example) and largely improve the spectrometer sensitivity. It can further be appreciated that high-throughput point source light coupling structures including a condenser and birefringent plates configured in accordance with concepts of the present invention provide broad spectral range (e.g., 400 nm to 1100 nm in this example).

Although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A light coupling structure for a spectrometer, the light coupling structure comprising:
   a light gateway configured for passing a portion of incident light into the light coupling structure;
   an optical member disposed in an optical path of the light coupling structure and configured to provide different optical paths with respect to rays of the portion of incident light; and
   a condenser disposed in the optical path of the light coupling structure between the light gateway and the optical member and configured to focus the portion of incident light on a camera lens of the spectrometer.

2. The light coupling structure of claim 1, wherein the condenser is configured in accordance with condenser configuration rules establishing relationships with respect to focal lengths of the condenser and the camera lens, numerical aperture of the condenser and the camera lens, distance between the condenser and the camera lens, and distance between the condenser and point source.

3. The light coupling structure of claim 1, wherein a focal length of the condenser is less than a focal length of the camera lens.

4. The light coupling structure of claim 3, wherein a distance between the condenser and the camera lens is greater than the focal length of the condenser.

5. The light coupling structure of claim 1, wherein a numerical aperture of the condenser is larger than a numerical aperture of the camera lens.

6. The light coupling structure of claim 1, wherein a distance between a center of the condenser and the light gateway is in accordance with $$\left| d_2 - \frac{f_2 d_3}{d_3 - f_2} \right| \tan \frac{\theta}{2} \le a_1 - a_2 \frac{d_2 - f_2}{f_2},$$

where $d_2$ is a distance between a center of the condenser and a center of the camera lens, $d_3$ is the distance between a center of the condenser and the light gateway, $f_2$ is a focal length of the condenser, $a_1$ is an aperture diameter of the light gateway, $a_2$ is an aperture diameter of the camera lens, and $\theta$ is a field of view angle of the camera lens.

7. The light coupling structure of claim 1, wherein the light gateway comprises a pinpoint light gateway structure selected from the group consisting of a pinhole, a slit, and an optical fiber connector.

8. The light coupling structure of claim 1, wherein the optical member comprises:
   a birefringent module having a first birefringent plate and a second birefringent plate disposed between a first polarizer and a second polarizer, wherein the first birefringent plate and the second birefringent plate are configured so that a principal section of the first birefringent plate is perpendicular to a principal section of the second birefringent plate and an optical axis of the second birefringent plate is parallel or vertical to a plane of the second birefringent plate.

9. The light coupling structure of claim 1, wherein the camera lens is a lens of an image capturing system of a mobile device, and wherein the light coupling structure comprises a removable unit configured to attach to the mobile device in juxtaposition with the lens of the image capturing system.

10. A method comprising:
    disposing a light coupling structure in juxtaposition with a lens of a mobile device imaging system, wherein the light coupling structure includes a light gateway configured for passing a portion of incident light into the light coupling structure, an optical member disposed in an optical path of the light coupling structure and configured to provide different optical paths with respect to rays of the portion of incident light, and a condenser disposed in the optical path of the light coupling structure between the light gateway and the optical member and configured to focus the portion of incident light on a camera lens of a spectrometer; and
    executing interferogram transform processing logic by a processor of the mobile device to transform an interference pattern provided by the light coupling structure into corresponding spectrum data.

11. The method of claim 10, wherein the condenser is configured in accordance with condenser configuration rules establishing relationships with respect to focal lengths of the condenser and the camera lens, numerical aperture of the condenser and the camera lens, distance between the condenser and the camera lens, and distance between the condenser and point source.

12. The method of claim 10, wherein a focal length of the condenser is less than a focal length of the camera lens.

13. The method of claim 12, wherein a distance between the condenser and the camera lens is greater than the focal length of the condenser.

14. The method of claim 10, wherein a numerical aperture of the condenser is larger than a numerical aperture of the camera lens.

15. The method of claim 10, wherein a distance between a center of the condenser and the light gateway is in accordance with $$\left| d_2 - \frac{f_2 d_3}{d_3 - f_2} \right| \tan\frac{\theta}{2} \leq a_1 - a_2 \frac{d_2 - f_2}{f_2},$$

where $d_2$ is a distance between a center of the condenser and a center of the camera lens, $d_3$ is the distance between a center of the condenser and the light gateway, $f_2$ is a focal length of the condenser, $a_1$ is an aperture diameter of the light gateway, $a_2$ is an aperture diameter of the camera lens, and $\theta$ is a field of view angle of the camera lens.

16. The method of claim 10, wherein the light gateway comprises a pinpoint light gateway structure selected from the group consisting of a pinhole, a slit, and an optical fiber connector.

17. The method of claim 10, wherein the optical member incudes a birefringent module having a first birefringent plate and a second birefringent plate disposed between a first polarizer and a second polarizer, wherein the first birefringent plate and the second birefringent plate are configured so that a principal section of the first birefringent plate is perpendicular to a principal section of the second birefringent plate and an optical axis of the second birefringent plate is parallel or vertical to a plane of the second birefringent plate.

18. A spectrometer comprising:
a light coupling structure including:
a point source configured for passing a portion of incident light into the light coupling structure;
a birefringent module disposed in an optical path of the light coupling structure and configured to provide different optical paths with respect to rays of the portion of incident light, wherein the birefringent module includes a first birefringent plate and a second birefringent plate disposed between a first polarizer and a second polarizer, wherein the first birefringent plate and the second birefringent plate are configured so that a principal section of the first birefringent plate is perpendicular to a principal section of the second birefringent plate and an optical axis of the second birefringent plate is parallel or vertical to a plane of the second birefringent plate; and
a condenser disposed in the optical path of the light coupling structure between the point source and an optical member of the light coupling structure and configured to focus the portion of incident light on a camera lens, wherein a focal length of the condenser is less than a focal length of the camera lens, wherein a distance between the condenser and the camera lens is greater than the focal length of the condenser, and wherein a numerical aperture of the condenser is larger than a numerical aperture of the camera lens; and
a processor-based mobile device including:
an imaging system having the camera lens and a camera sensor; and
interferogram transform processing logic stored in a computer readable memory of the processor-based mobile device which when executed by a processor of the processor-based mobile device transforms an interference pattern provided by the light coupling structure into corresponding spectrum data.

19. The spectrometer of claim 18, wherein a distance between a center of the condenser and the point source is in accordance with $$\left| d_2 - \frac{f_2 d_3}{d_3 - f_2} \right| \tan\frac{\theta}{2} \leq a_1 - a_2 \frac{d_2 - f_2}{f_2},$$

where $d_2$ is a distance between a center of the condenser and a center of the camera lens, $d_3$ is the distance between a center of the condenser and the point source, $f_2$ is a focal length of the condenser, $a_1$ is an aperture diameter of the point source, $a_2$ is an aperture diameter of the camera lens, and $\theta$ is a field of view angle of the camera lens.

20. The spectrometer of claim 18, wherein the condenser is an optical element selected from the group consisting of a lens, a lens group, a prism, and a concave mirror configured to render a divergent beam from the point source into a converging beam.

* * * * *

UNITED STATES PATENT AND TRADEMARK OFFICE
CERTIFICATE OF CORRECTION

PATENT NO. : 11,215,504 B2
APPLICATION NO. : 17/089518
DATED : January 4, 2022
INVENTOR(S) : Jiangquan Mai It is certified that error appears in the above-identified patent and that said Letters Patent is hereby corrected as shown below:

In the Specification

At Column 2, Line number 37, delete "600 to 120°" and replace with --60° to 120°--.
At Column 8, starting at Line number 43, delete "$(1.5*f_2)<d_2<(3.0*f_2)$" and replace with --$(1.5*f_2) \leq d_2 \leq (3.0*f_2)$--.
At Column 8, Line number 46, delete "$d_2$ is ~ $(2.0*f_2)$" and replace with --$d_2$ is $\approx (2.0*f_2)$--.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*